United States Patent
Laha et al.

(10) Patent No.: US 10,219,318 B2
(45) Date of Patent: Feb. 26, 2019

(54) METHOD AND APPARATUS FOR SUPPORTING FEMTOCELL SERVICE CAPABILITIES FOR SERVICES

(71) Applicant: InterDigital Patent Holdings, Inc., Wilmington, DE (US)

(72) Inventors: Kushanava Laha, Haryana (IN); John L. Tomici, Southold, NY (US); Prabhakar R. Chitrapu, Blue Bell, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/699,797

(22) Filed: Sep. 8, 2017

(65) Prior Publication Data
US 2017/0374709 A1 Dec. 28, 2017

Related U.S. Application Data

(63) Continuation of application No. 13/813,757, filed as application No. PCT/US2011/046279 on Aug. 2, 2011, now Pat. No. 9,801,233.
(Continued)

(51) Int. Cl.
*H04W 84/10* (2009.01)
*H04W 4/18* (2009.01)
(Continued)

(52) U.S. Cl.
CPC ............. *H04W 84/10* (2013.01); *H04L 67/20* (2013.01); *H04W 4/18* (2013.01); *H04L 67/16* (2013.01);
(Continued)

(58) Field of Classification Search
CPC ..... H04W 4/18; H04W 84/10; H04W 84/045; H04W 88/16; H04L 67/20; H04L 67/24; H04L 67/16
See application file for complete search history.

(56) References Cited

U.S. PATENT DOCUMENTS

2007/0270152 A1 11/2007 Nylander et al.
2008/0293382 A1 11/2008 Lubenski et al.
(Continued)

OTHER PUBLICATIONS

3rd Generation Partnership Project (3GPP), TS 29.198-10 V9.0.0, "Technical Specification Group Core Network, Open Service Access (OSA), Application Programming Interface (API), Part 10: Mobility Service Capability Feature (SCF) (Release 9)", Dec. 2009, 58 pages.
(Continued)

*Primary Examiner* — Jae Y Lee
(74) *Attorney, Agent, or Firm* — Condo Roccia Koptiw LLP

(57) ABSTRACT

Techniques for supporting utilization of femtocell service capabilities for services are disclosed. A network device may be configured to implement a femto services gateway. The femto services gateway may reside in a femtocell and provide application programming interfaces (APIs) to services to enable applications implementing the services to make use of functionalities of femtocell service capabilities. The APIs may be a subset of or an extended set of Open Service Access Parlay or Parlay-X APIs. The services may be either femtocell-hosted, mobile network operator core network-hosted, or Internet-hosted. The femtocell service capabilities may include a framework service capability feature (SCF), a call control SCF, a user interaction SCF, a mobility SCF, a terminal capability SCF, a data session control SCF, a connectivity manager SCF, an account management SCF, a charging management SCF, a policy man-
(Continued)

agement SCF, a presence and availability management SCF, or a multimedia messaging SCF.

18 Claims, 12 Drawing Sheets

Related U.S. Application Data

(60) Provisional application No. 61/369,915, filed on Aug. 2, 2010.

(51) Int. Cl.
*H04L 29/08* (2006.01)
*H04W 84/04* (2009.01)
*H04W 88/16* (2009.01)

(52) U.S. Cl.
CPC .......... *H04L 67/24* (2013.01); *H04W 84/045* (2013.01); *H04W 88/16* (2013.01)

(56) References Cited

U.S. PATENT DOCUMENTS

2009/0135795 A1 5/2009 Lim et al.
2009/0257416 A1* 10/2009 Walker .................. H04W 8/20 370/338

OTHER PUBLICATIONS

3rd Generation Partnership Project (3GPP), TS 29.198-11 V9.0.0, "Technical Specification Group Core Network, Open Service Access (OSA), Application Programming Interface (API), Part 11: Mobility Service Capability Feature (SCF) (Release 9)", Dec. 2009, 44 pages.
3rd Generation Partnership Project (3GPP), TS 29.198-12 V9.0.0, "Technical Specification Group Core Network, Open Service Access (OSA), Application Programming Interface (API), Part 12: Mobility Service Capability Feature (SCF) (Release 9)", Dec. 2009, 56 pages.
3rd Generation Partnership Project (3GPP), TS 29.198-13 V9.0.0, "Technical Specification Group Core Network, Open Service Access (OSA), Application Programming Interface (API), Part 13: Mobility Service Capability Feature (SCF) (Release 9)", Dec. 2009, 124 pages.
3rd Generation Partnership Project (3GPP), TS 29.198-14 V9.0.0, "Technical Specification Group Core Network, Open Service Access (OSA), Application Programming Interface (API), Part 14: Presence and Availability Management (PAM) Service Capability Feature (SCF) (Release 9)", Dec. 2009, 112 pages.
3rd Generation Partnership Project (3GPP), TS 29.198-15 V9.0.0, "Technical Specification Group Core Network and Terminals, Open Service Access (OSA), Application Programming Interface (API), Part 15: Multi-media Messaging (MM) Service Capability Feature (SCF) (Release 9)", Dec. 2009, 96 pages.
3rd Generation Partnership Project (3GPP), TS 29.198-3 V9.0.0, "Technical Specification Group Core Network, Open Service Access (OSA), Application Programming Interface (API), Part 3: Framework (Release 9)", Dec. 2009, 209 pages.
3rd Generation Partnership Project (3GPP), TS 29.198-4 V4.11.0, "Technical Specification Group Core Network, Open Service Access (OSA), Application Programming Interface (API), Part 4: Call control Service Capability Feature (SCF) (Release 4)", Dec. 2004, 148 pages.
3rd Generation Partnership Project (3GPP), TS 29.198-5 V9.0.0, "Technical Specification Group Core Network, Open Service Access (OSA), Application Programming Interface (API), Part 5: User interaction Service Capability Feature (SCF) (Release 9)", Dec. 2009, 72 pages.
3rd Generation Partnership Project (3GPP), TS 29.198-6 V9.0.0, "Technical Specification Group Core Network, Open Service Access (OSA), Application Programming Interface (API), Part 6: Mobility Service Capability Feature (SCF) (Release 9)", Dec. 2009, 85 pages.
3rd Generation Partnership Project (3GPP), TS 29.198-7 V9.0.0, "Technical Specification Group Core Network, Open Service Access (OSA), Application Programming Interface (API), Part 7: Mobility Service Capability Feature (SCF) (Release 9)", Dec. 2009, 32 pages.
3rd Generation Partnership Project (3GPP), TS 29.198-8 V9.0.0, "Technical Specification Group Core Network, Open Service Access (OSA), Application Programming Interface (API), Part 8: Mobility Service Capability Feature (SCF) (Release 9)", Dec. 2009, 43 pages.
European Telecommunications Standards Institute (ETSI), ES 204 915-1 V1.1.1, "Open Service Access (OSA), Application Programming Interface (API), Part 1: Overview (Parlay 6)", May 2008, 64 pages.

* cited by examiner

METHOD AND APPARATUS FOR SUPPORTING FEMTOCELL SERVICE CAPABILITIES FOR SERVICES

CROSS REFERENCE TO RELATED APPLICATIONS

This application is a continuation application of U.S. patent application Ser. No. 13/813,757, filed Jan. 21, 2014; which is a 35 U.S.C. § National Phase application of PCT/US2011/046279, filed Aug. 2, 2011; which claims the benefit of U.S. provisional application No. 61/369,915 filed Aug. 2, 2010, the contents of which is hereby incorporated by reference herein.

BACKGROUND

A femtocell, (e.g., Home NodeB (HNB) or Home evolved Node B (HeNB)), is a customer-premise device that may connect wireless transmit/receive units (WTRUs) over a macro-area wireless network air interface, (such as Universal Mobile Telecommunication System (UMTS) or Long Term Evolution (LTE)), to the mobile network operator's core network using a broadband IP network.

The current trend for mass consumer deployment of femtocells is driven by factors such as better indoor coverage, improved data access tariffs, higher speed of data service, and enhanced call quality, with complete operator management in existing spectrum and at reduced cost per bit. Femto services would be the next wave in the connected digital home and other usage scenarios, such as enterprise and public spaces, for new services. For the connected home segments, applications are based on service themes like remote control of home appliances, virtual fridge notes, home security, video door bell, connected home media, wireline phone emulation, etc. For the enterprise and metro-zone segments, applications are based on themes like personal shopper, targeted local advertising, etc.

The handset (i.e., WTRU) application market today is booming. Many applications today are handset-hosted. The time to market for an application takes a much faster route when the application intelligence is bundled within the handset than if it had to be hosted out of the telecom network infrastructure. However, such applications often tend to be 'over-the-top' type and may not involve the mobile network operator. It is therefore useful to develop femto service solutions which are hosted by the mobile network operator as well.

SUMMARY

Method and apparatus for supporting utilization of femtocell service capabilities for services are disclosed. A network device may comprise a processor configured to implement a femto services gateway, (i.e., femto-OSA-Parlay-gateway). The femto services gateway may reside in a femtocell and provide application programming interfaces (APIs) to services to enable applications implementing the services to make use of functionalities of femtocell service capabilities. The APIs may be a subset of or an extended set of Open Service Access (OSA) Parlay or Parlay-X APIs. The services may be either femtocell-hosted, mobile network operator core network-hosted, or Internet-hosted. The femto services gateway may be configured to provide resource interface, (i.e., network connectivity layer), to a femto radio network controller (RNC) application. The femtocell service capabilities may include at least one of a framework service capability feature (SCF), a call control SCF, a user interaction SCF, a mobility SCF, a terminal capability SCF, a data session control SCF, a connectivity manager SCF, an account management SCF, a charging management SCF, a policy management SCF, a presence and availability management SCF, or a multimedia messaging SCF.

BRIEF DESCRIPTION OF THE DRAWINGS

A more detailed understanding may be had from the following description, given by way of example in conjunction with the accompanying drawings wherein.

DETAILED DESCRIPTION

Figure 1A:
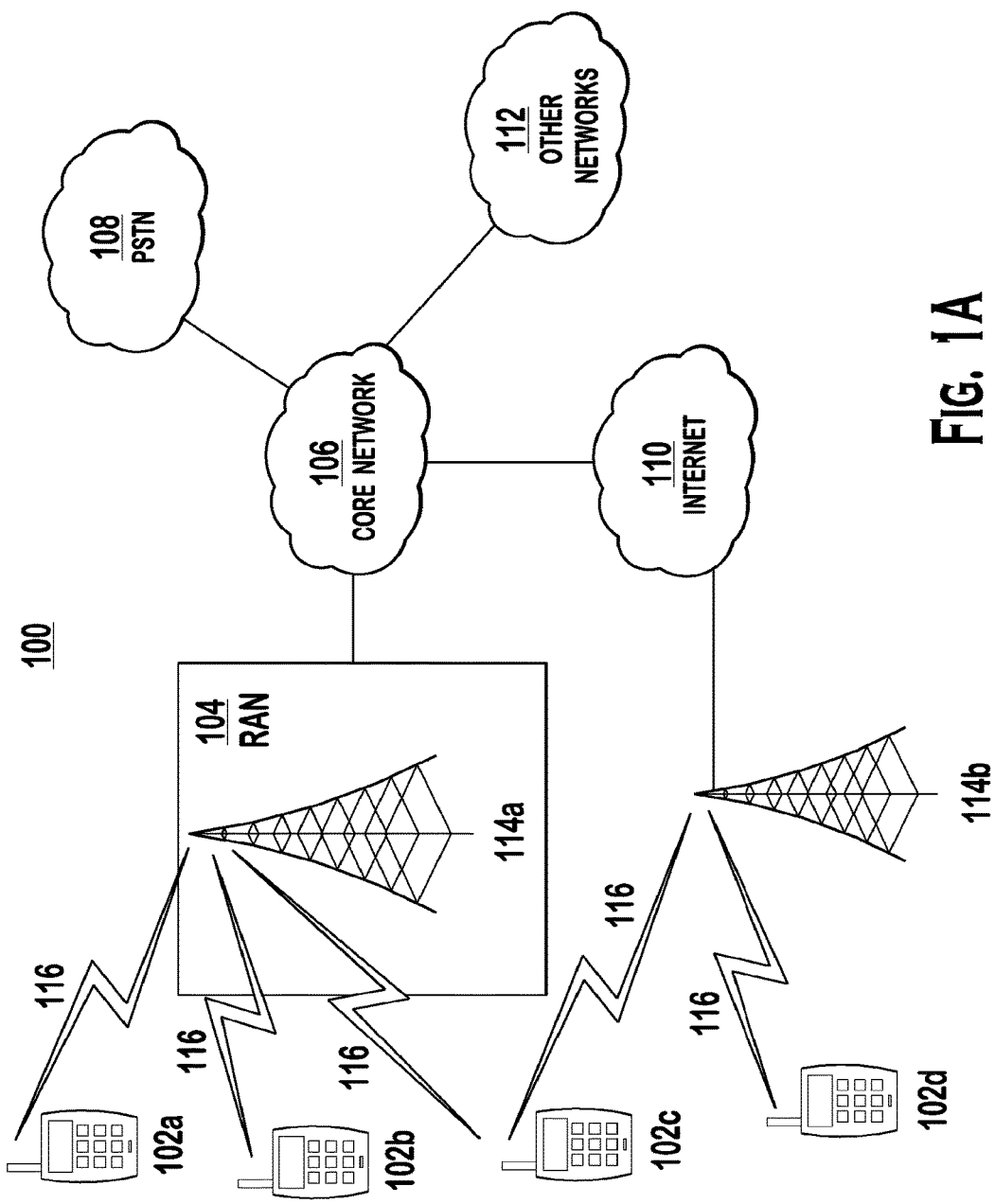
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home NodeB (HNB), a Home eNodeB (HeNB), a site controller, an access point (AP), a femto access point (FAP), a converged gateway (CGW), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a,
Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
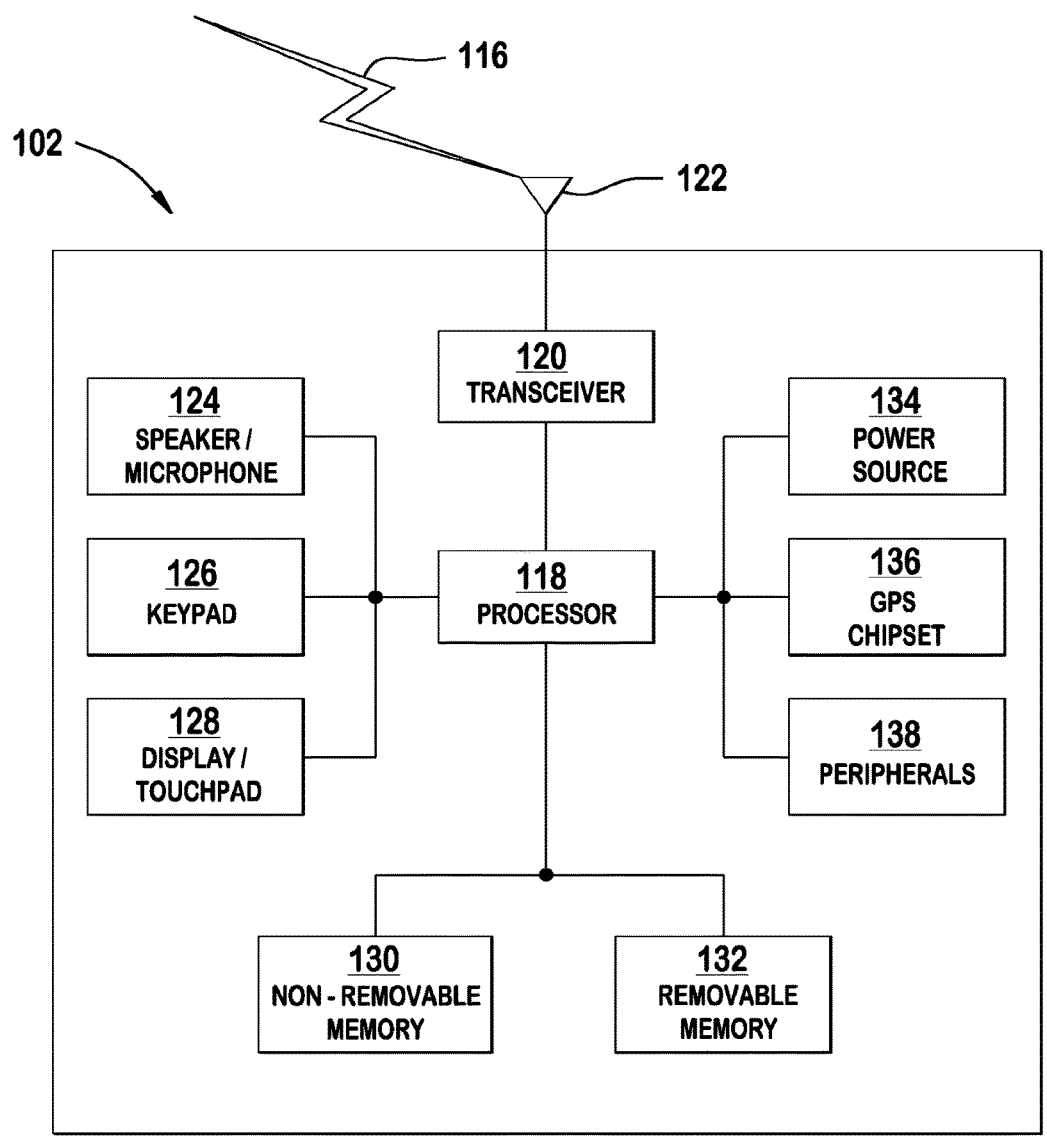
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
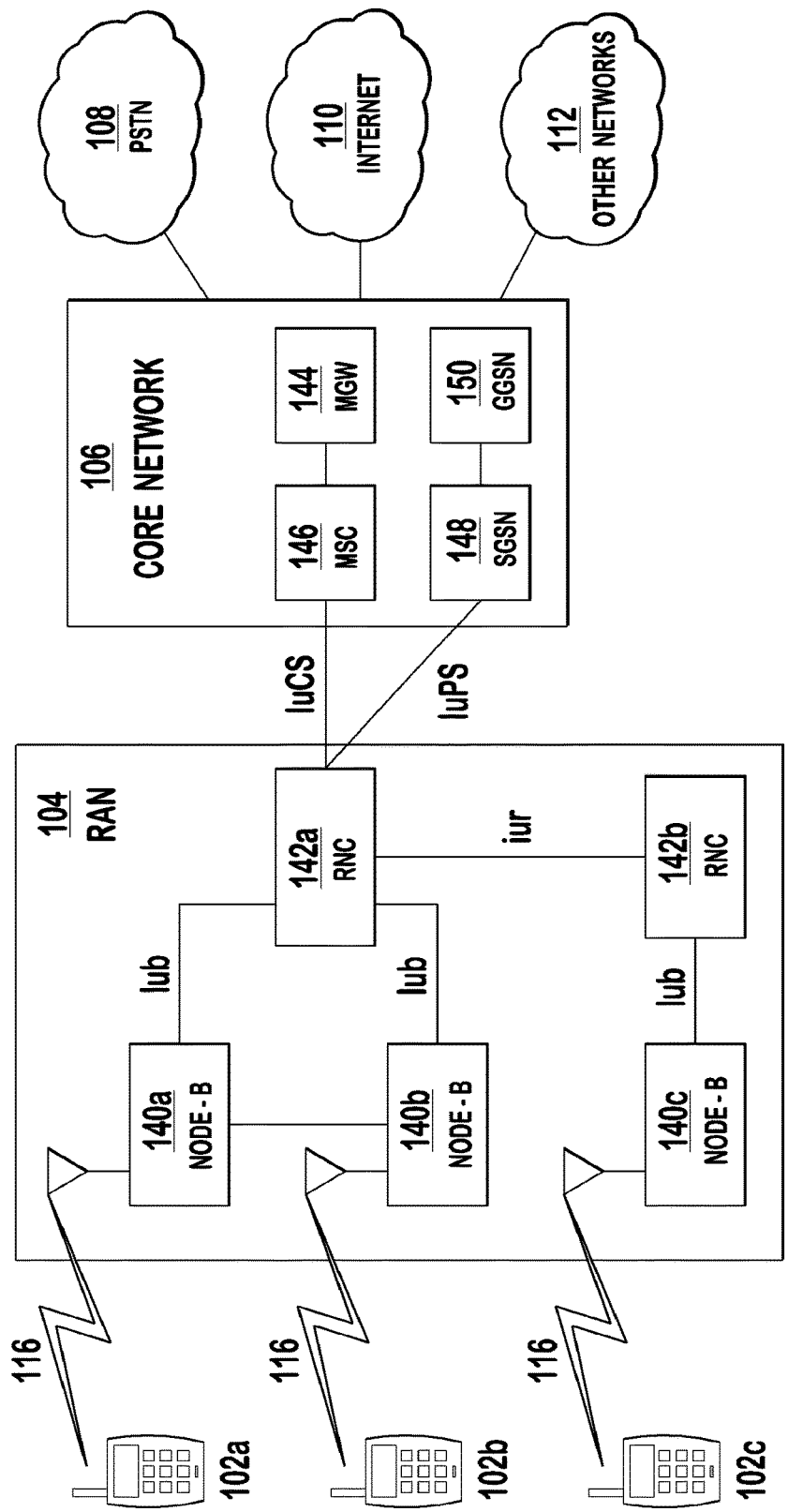
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

While the embodiments hereafter are disclosed in the context of the user services being offered locally by the femtocell, the embodiments are applicable to the context where user services, operator services, or any other services are provided by the femtocell, by the mobile network operator, or by an Internet service provider, etc.

Figure 2:
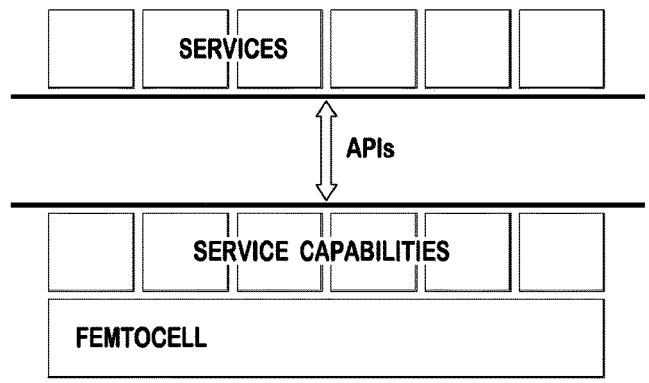
FIG. 2 shows the service architecture in the context of femtocell-hosted services in accordance with one embodiment.

FIG. 2 shows the service architecture in the context of femtocell-hosted services in accordance with one embodiment. The APIs, (e.g., Open Service Access (OSA) APIs, also called Parlay), form the boundary between the services (i.e., applications) and the femtocell service capabilities. The OSA APIs enable applications implementing the services to make use of the functionalities of the femtocell service capabilities. The functionalities offered to the applications are defined in terms of a set of service capability features (SCFs) in the API, which are supported by different service capability servers. A service capability is a container of related functions that is implementation independent, (i.e., has no implication as to how it is implemented). The functionalities, (i.e., SCFs), offered by the femtocell service capabilities are accessible via the standardized APIs. A service is a solution, business, or application logic with a specific purpose that uses one or more service capabilities invoked through their APIs as building blocks.

The applications (i.e., user services, operator services, or the like) may be locally-hosted (i.e., running within the femtozone perimeter: handset, or femtocell/H(e)NB), carrier-hosted (e.g., H(e)NB gateway, security gateway (SeGW), mobile core network, IP multimedia subsystem (IMS), etc.), third party-hosted (i.e., Internet), or any combination of these. The user/operator service-capable femto ecosystem may package these service APIs in service development kits (SDKs) for the mass market to consume the APIs and deploy applications.

The terminologies "service", "enabler", "application", "services framework", "service suite", "service functionality", etc. will be used interchangeably.

Figure 3:
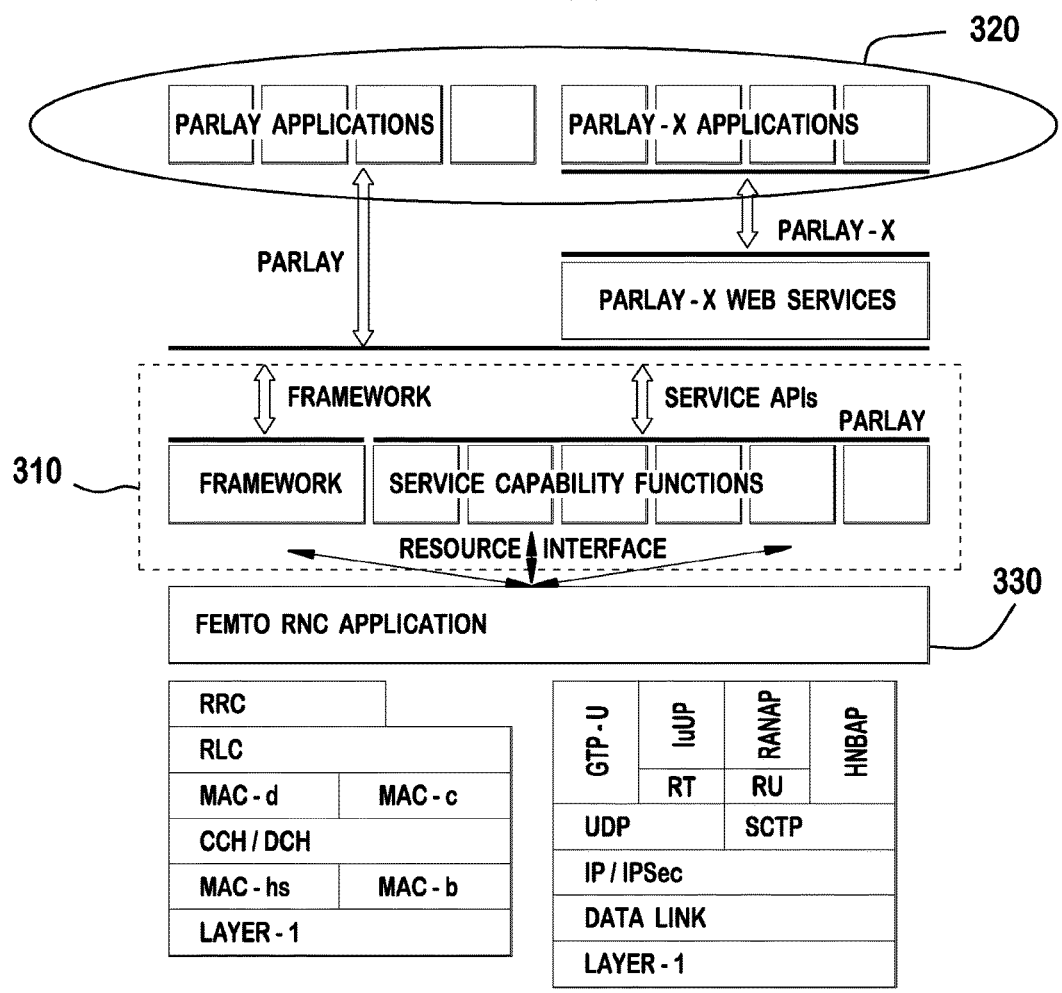
FIG. 3 shows an example femtocell-based service capability architecture in accordance with one embodiment.
Figure 8:
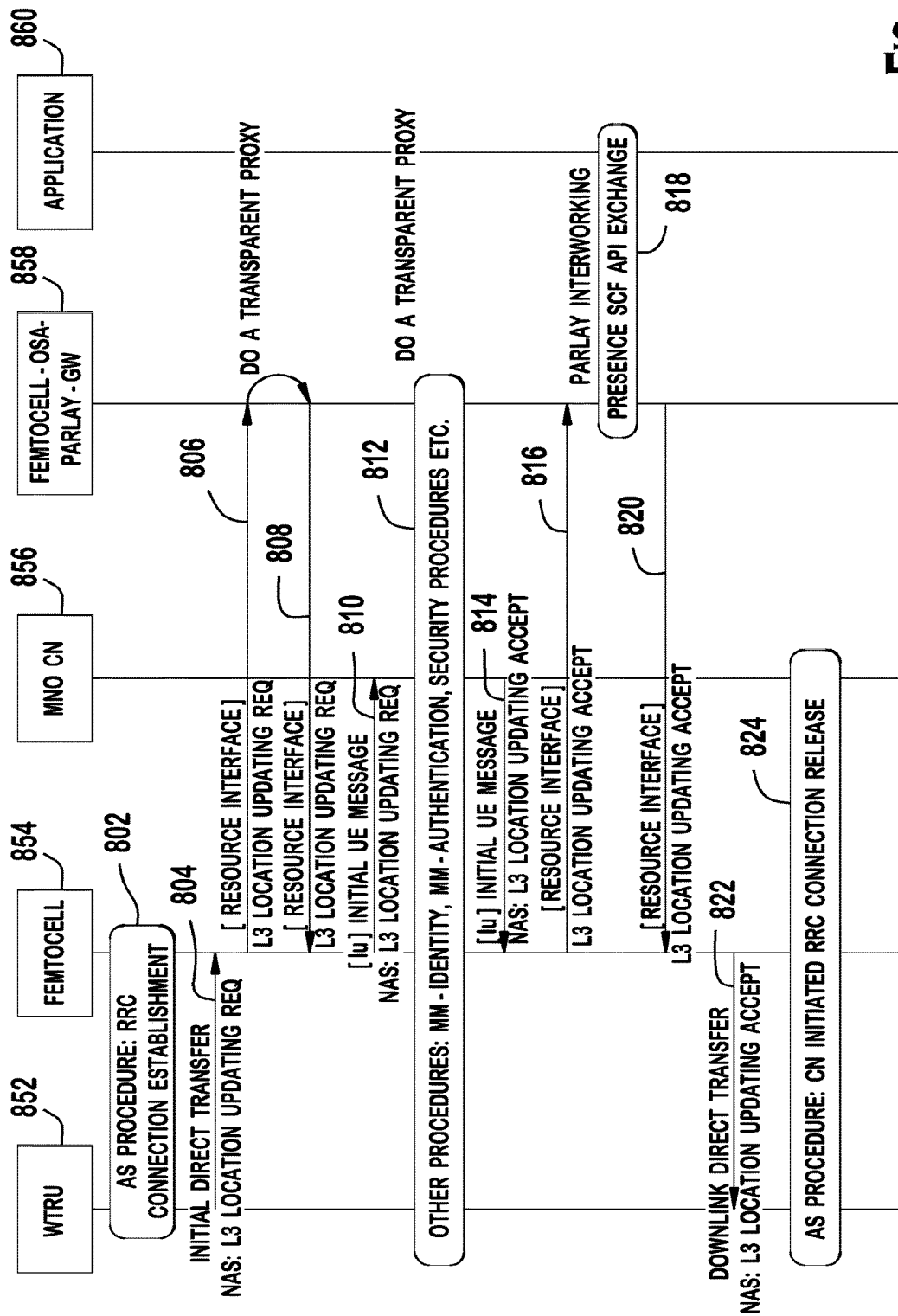
FIG. 8 is an example call flow for femtocell-OSA-Parlay-gateway interworking for a presence service capability feature (SCF) in accordance with one embodiment.
Figure 9A:
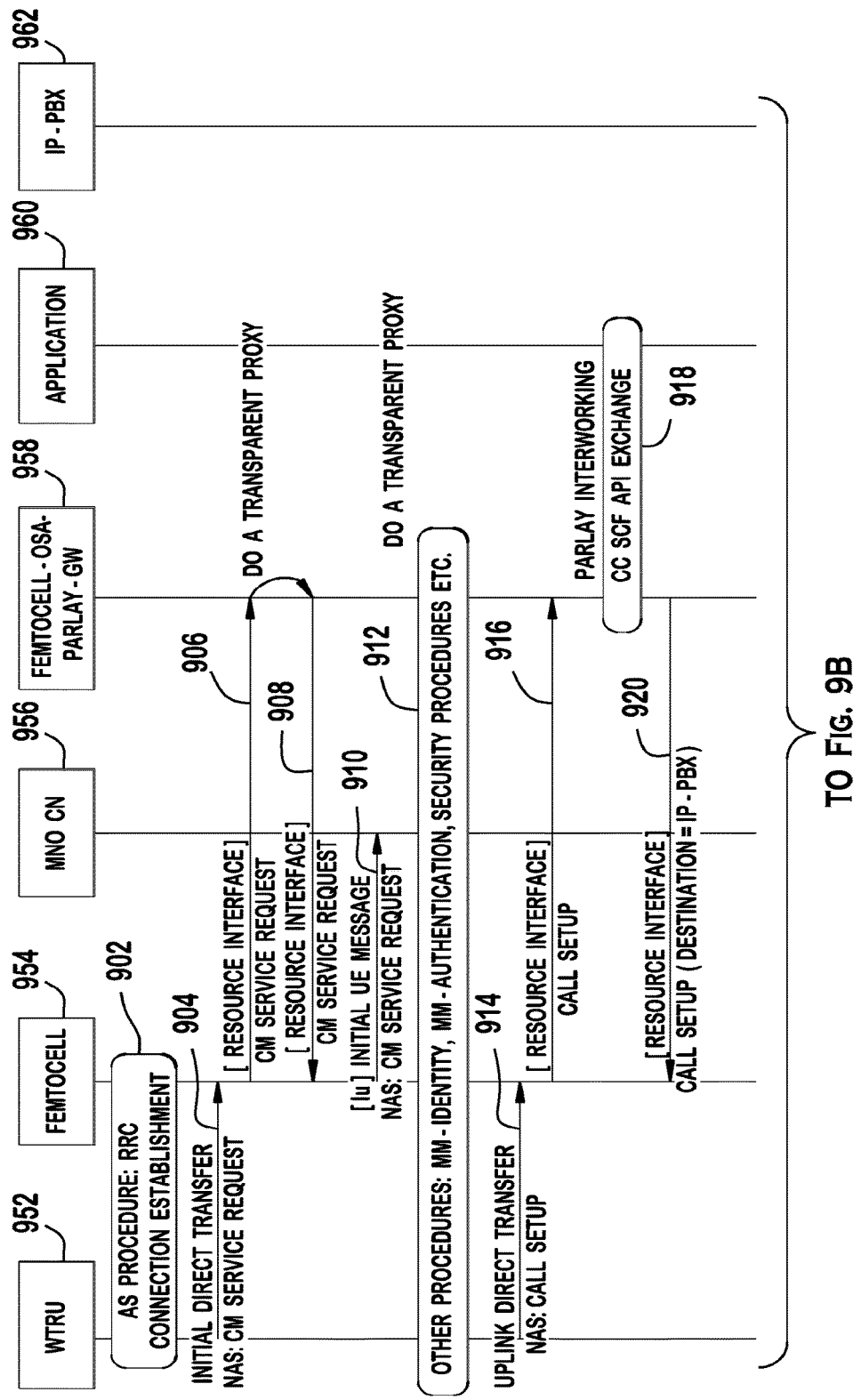
FIGS. 9A and 9B are an example call flow for femtocell-OSA-Parlay-gateway interworking for call control SCF in an intra-enterprise call case in accordance with one embodiment.

FIG. 3 shows an example femtocell-based service capability architecture in accordance with one embodiment. A femto-OSA-Parlay-gateway 310 (i.e., the femto services gateway for the framework and service capability servers), is introduced to provide a relevant set of capabilities, (i.e., framework and service capability functions), of the femtocell to the applications 320, (i.e., Parlay or Parlay-X applications). The south-bound APIs of the femto-OSA-Parlay-gateway 310 forms the resource interface, (i.e., network connectivity layer), to the femto RNC application 330, and the north-bound APIs of the femto-OSA-Parlay-gateway 310 are the APIs to the applications 320. The APIs to the applications 320 may comprise trimmed or extended set of the conventional Parlay or Parlay-X APIs. The resource interface transports NAS messages received by the femtocell, either from the WTRU or the network, to the femto-OSA-Parlay-gateway 310, which analyzes them and determines what action needs to be taken on the message. A WTRU-initiated NAS message (e.g., a message in 804, 806 in FIG. 8), or a network-initiated NAS message, (e.g., a message in 814, 816 in FIG. 8), may be sent to the femto-OSA-Parlay-gateway 310. Some of these messages may be passed through the femto-OSA-Parlay-gateway 310 transparently, whereas others may be processed and/or modified by the femto-OSA-Parlay-gateway 310. For example, the message in 806 in FIG. 8 is transparently passed through the femto-OSA-Parlay-gateway, whereas the message in 816 in FIG. 8 is sent to the femto-application 860 for processing before being passed through as the original unmodified message back to the femtocell. Similarly, the message in 916 in FIG. 9A is passed on to the femto-application, which results in a modified message 920, which is sent back to the femtocell.

The femto-OSA-Parlay-gateway 310, which may reside in a femtocell, receives a request from applications running on an application server to make use of functionalities of femtocell service capabilities, which are offered for use to the applications implementing services via APIs, and responds to the request to the application. Specific methods are specified in the SCFs. For example, an application may request user-related event notifications pertaining to a particular user for which the service implemented by the application is activated. The femto-OSA-Parlay-gateway 310, (i.e., service capability server), may then report user-related event notifications in which it explicitly identifies the user to which the event applies. Femto-OSA-Parlay-gateway 310 may report user-related events to the application without the application having explicitly subscribed to the event. This functionality is supported by all relevant SCFs, like call and session control SCF, presence SCF, and the like, which will be explained in detail below.

The femto-OSA-Parlay-gateway 310 may reside outside the femtocell, for example due to memory, central processing unit (CPU), or other resources limitations. In this case, the resource interface is outside the scope of Parlay. A femtocell vendor may implement a proprietary resource interface and provide the femto-OSA-Parlay-gateway software, with a Parlay SDK, on which services can be developed.

Alternatively, if memory, CPU, or other resources are permitting, the femto-OSA-Parlay-gateway 310 may reside within the femtocell. In this case, the resource interface is internal to the femtocell. The femtocell may come with the Parlay SDK and expose Parlay APIs.

Alternatively, if memory, CPU, or other resources are permitting, along with the femto-OSA-Parlay-gateway 310, the femtocell may also host the Parlay-X Web services. In this case, the resource interface is internal to the femtocell. The femtocell may come with both the Parlay and Parlay-X SDK and expose both Parlay and Parlay-X APIs for service developers to choose whether to use Parlay or Parlay-X APIs for application development.

Alternatively, if memory, CPU, or other resources are permitting, in addition to the above, the femtocell may provide a general purpose computing platform on which applications (as web services) may be installed and executed.

Figure 4A:
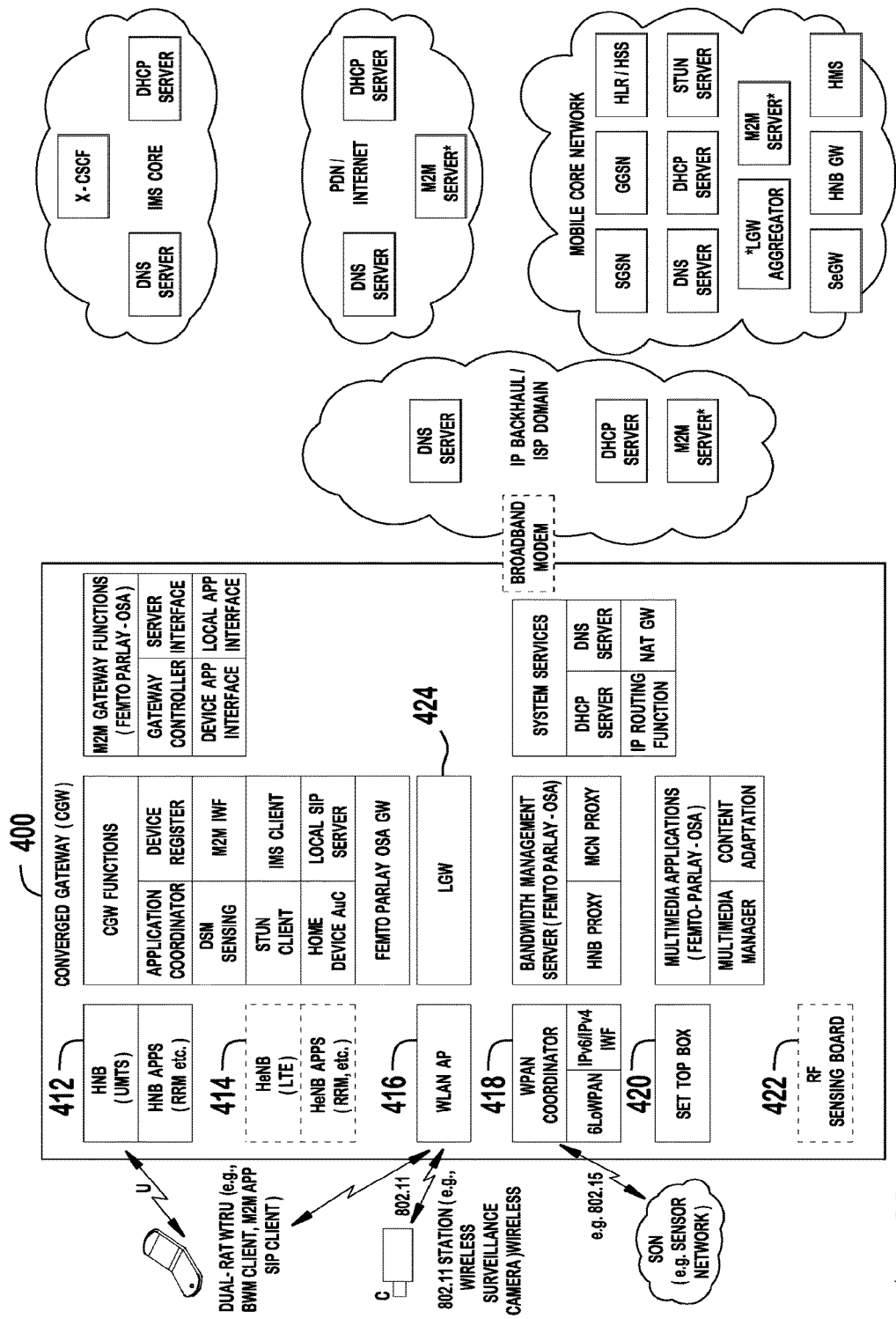
FIG. 4A shows an example converged gateway (CGW) architecture with a femto services platform in accordance with one embodiment.

FIG. 4A shows an example converged gateway (CGW) architecture with a femto services platform in accordance with one embodiment. The CGW 400 may include a femtocell access point (FAP), (e.g., home NodeB (HNB) 412 or home evolved NodeB (HeNB) 414), and other wireless AP(s), such as wireless local area network (WLAN) AP 416, wireless personal area network (WPAN) AP 418, etc. The CGW may include a set top box 420 for TV and/or a radio frequency (RF) sensing board 422 for checking RF condition. The CGW 400 may also include a local gateway (LGW) 424. The CGW 400 may implement a plurality of service functions including, but not limited to, CGW functions, femto-OSA-Parlay-gateway functions, bandwidth management functions, multimedia applications, and/or machine-to-machine (M2M) gateway functions, etc. The femto-OSA-Parlay-gateway functions interact with the HNB/HeNB or the LGW and each of the local service functions.

Figure 4B:
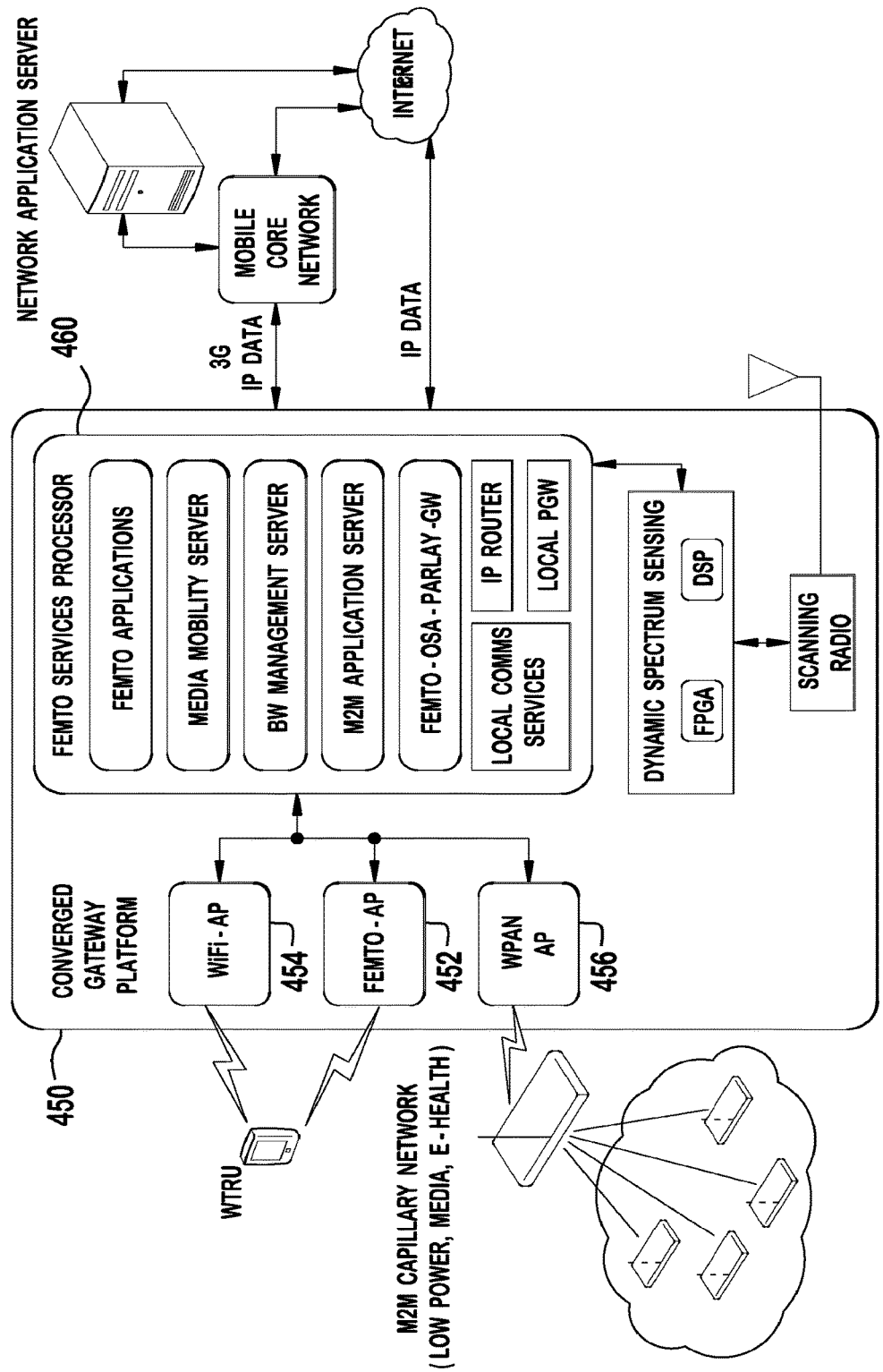
FIG. 4B is an alternate illustration of an example CGW architecture with a femto services platform.

FIG. 4B is an alternate illustration of an example CGW architecture with a femto services platform. The CGW 450 may include a femto AP 452 (i.e., HNB or HeNB), a WiFi AP 454, and a WPAN AP 456, etc., and the processor 460 on the CGW 450 may implement femto applications, media mobility server, bandwidth management server, M2M application server, and femto-OSA-Parlay-gateway.

Embodiments for services architecture with femtocell-based service capability functions are disclosed hereafter. It is assumed that the smart-home/smart-enterprise is equipped with an HNB and a LGW. However, the embodiments are applicable to other cases. For example, the HNB may be replaced with an HeNB and the LGW may be absent.

Figure 5:
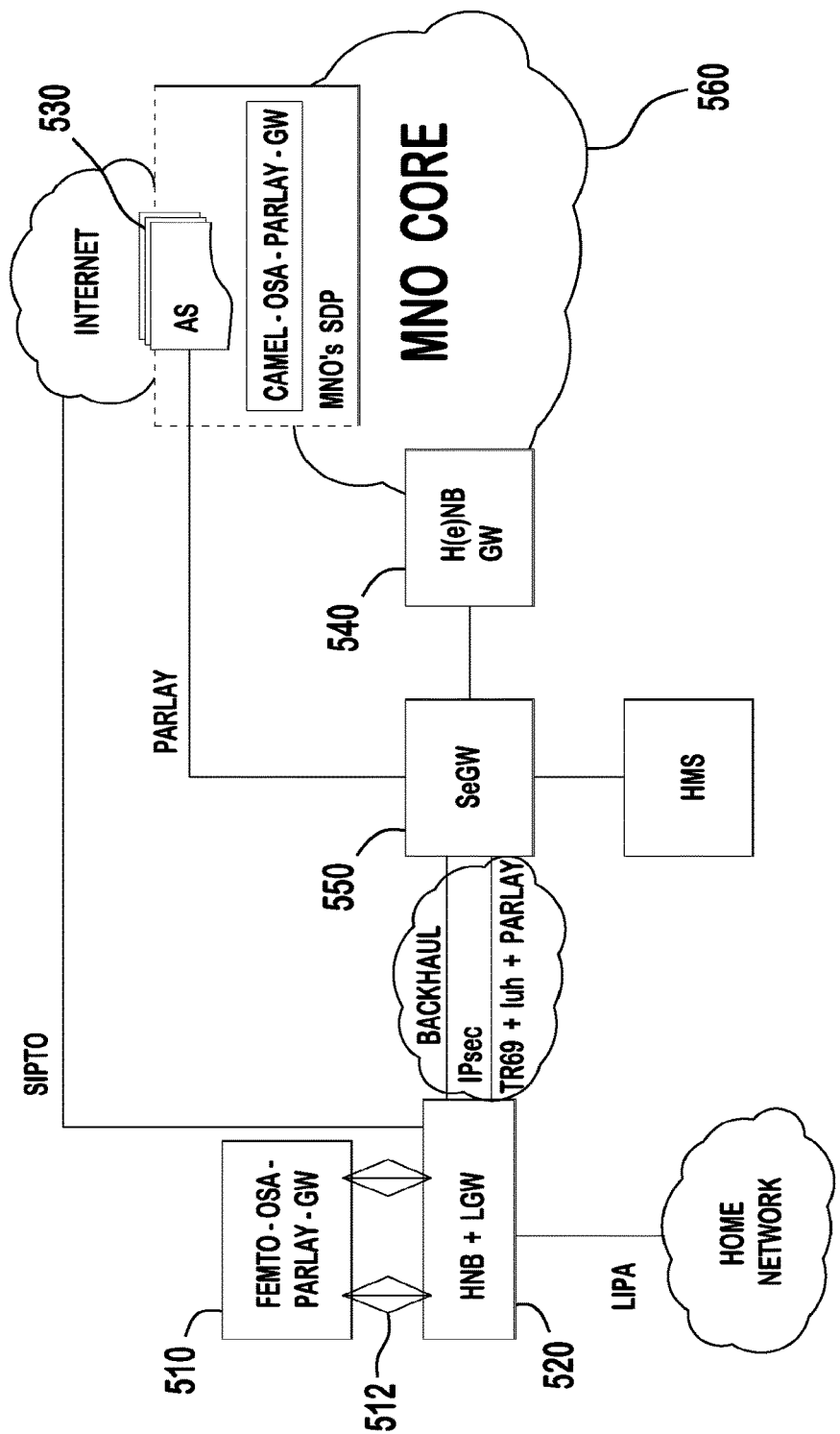
FIG. 5 shows an example case of carrier-hosted services making use of the femtocell-hosted service capabilities in accordance with one embodiment.

FIG. 5 shows an example case of carrier-hosted services making use of the femtocell-hosted service capabilities in accordance with one embodiment. In this example, the services are not in the home/enterprise zone, but in the mobile network operator (MNO) core network. The femto-OSA-Parlay-gateway 510 is within home, (i.e., on femtocell). The femto-OSA-Parlay-gateway 510 interacts with the HNB/LGW 520 via the resource interface 512. The resource interface may be a secure interface, so that the service related data exposed via the Parlay APIs may be protected. For example, IPSec may be used for this purpose.

The network-hosted services on the application server (AS) 530 are making use of the service capabilities exposed by the femtocell. The service capabilities are exposed as Parlay APIs and backhauled, for example, over the IPSec tunnel via the security gateway (SeGW) 550 to the MNO core network 560, (i.e., to the H(e)NB gateway 550), and then consumed at the application layer.

Alternatively, the services may run in the carrier network and make use of the APIs exposed both from the femtocell as well as the core network. The femto-OSA-Parlay-gateway may be in the femtocell, (e.g., on the CGW at home/enterprise), and its Parlay/Parlay-x APIs are long-hauled to the core network as explained above. An equivalent core-network-OSA-Parlay-gateway may be provided in the core network that exposes network APIs and the services may use both the APIs for services.

The service capabilities used by the network-hosted services may include a framework SCF, a call control SCF, a user interaction SCF, a mobility SCF, a terminal capability SCF, a data session control SCF, a connectivity manager SCF, an account management SCF, a charging management SCF, a policy management SCF, a presence and availability management SCF, and/or a multimedia messaging SCF, and the like.

The framework SCF provides applications with basic mechanisms that enable them to make use of the service capabilities in the network. Examples of framework SCF include authentication, registration, discovery, etc. The SCFs made available to the applications are registered in the framework. Before an application can use the network functionality made available through the SCFs, authentication between the application and framework is needed. After authentication, the discovery function enables the application to find out which SCFs are provided by the service capability servers.

The call control SCF supports requirements related to circuit switched (CS) call control, IP multimedia subsystem (IMS) session control, call/session charging, and the like. The call control SCF supports management function for call/session-related issues, (e.g., enable or disable call/session-related event notifications), call/session control, (e.g., route, disconnect), or the like.

The user interaction SCF support requirements for information transfer. The user interaction SCFs include a generic user interaction SCF used by applications to interact with end users, and a call user interaction SCF used by applications to interact with end users participating to a call.

The call control SCF and the user interaction SCF in this case may not be relevant as network-hosted services may use MNO core network-based service capabilities, (e.g., CAMEL-OSA-Parlay-GW), to manage/supervise calls and do user interaction.

The mobility SCF supports requirements for user location and user status based on network-related information. The mobility SCF provides terminal location information and general terminal status monitoring. While the MNO core network-based service capabilities may provide WTRU location information to the network-based services, the femtocells may provide more accurate and value added location information.

The terminal capability SCF provides applications information about the terminal capabilities of the user. The WTRU terminal capabilities may be supported by the MNO core network-based service capabilities as it is the same WTRU that shuttles between the macro and femto zones. What is additionally required is the femtocell capabilities, (i.e., the femtocell as an end user terminal), for example, WiFi support, support of generic purpose platform for downloading locally executable applications, etc. The femtocell capabilities may be a new service capability function or an extension to the terminal capabilities SCF.

The data session control SCF supports requirements related to packet switched (PS) call control. The data session control SCF supports management functions for data session related issues, (e.g. enable or disable data session-related event notifications), and session control, (e.g., route, disconnect, etc.). The data session control SCF is relevant to network-hosted services for the purpose of establishing application-initiated local IP access (LIPA), selected IP traffic offload (SIPTO), MRA, extended LIPA (eLIPA) data sessions. The application may initiate such data sessions through the femtocell service capabilities as per application needs.

The connectivity manager SCF is relevant to LIPA, SIPTO, MRA, and eLIPA data sessions and for example for prioritized treatment of service traffic as per quality of service (QoS) traffic templates.

The account management SCF addresses requirements related to the features for monitoring a subscriber's account, such as retrieval of transaction history for a certain subscriber's account, query of the balance of the account of one or several subscribers, or request of notifications on certain criteria for one or several subscribers.

The charging management SCF addresses requirements for charging related to service usage. The charging management SCF permits an application to access subscriber accounts maintained by the network and charge subscribers for service usage. The network-based applications may rely on network-based charging service capabilities.

The policy management SCF addresses requirement for policy management. The policy management SCF provides policy management and evaluation mechanisms, and contains APIs to create, delete, update, and view policies, and also supports interactions between policies and entities. The policy management SCF is applicable to femtocells such that policies may be defined for handling and diverting calls, (e.g., to femto-hosted wireline phones), data sessions, (e.g., bringing bandwidth manager (BWM) in the path), load balancing femtocells with BWM and security gateways within the enterprise, etc.

The presence and availability management SCF addresses requirements on presence-related capability functions. Presence-related information may be requested or supplied by an OSA application and may include, but not be limited to, presence information pertaining to the presence service or user availability. The presence and availability management SCF may require the support of a presence server network element and the network-based applications may rely on network-based presence and availability management service capabilities.

The multimedia messaging SCF addresses requirements for multimedia messaging. The multimedia messaging SCF allows applications to send and receive messages both within and outside the context of a session, put messages in the mailbox for storage or for sending by the messaging system, cancel a message previously sent or query the status of a message previously sent, manipulate folders and messages in the mailbox, list messages in the mailbox and retrieve complete messages, message headers, message body or parts of the message body, or the like. Network-based applications may rely on network-based messaging service capabilities.

Figure 6:
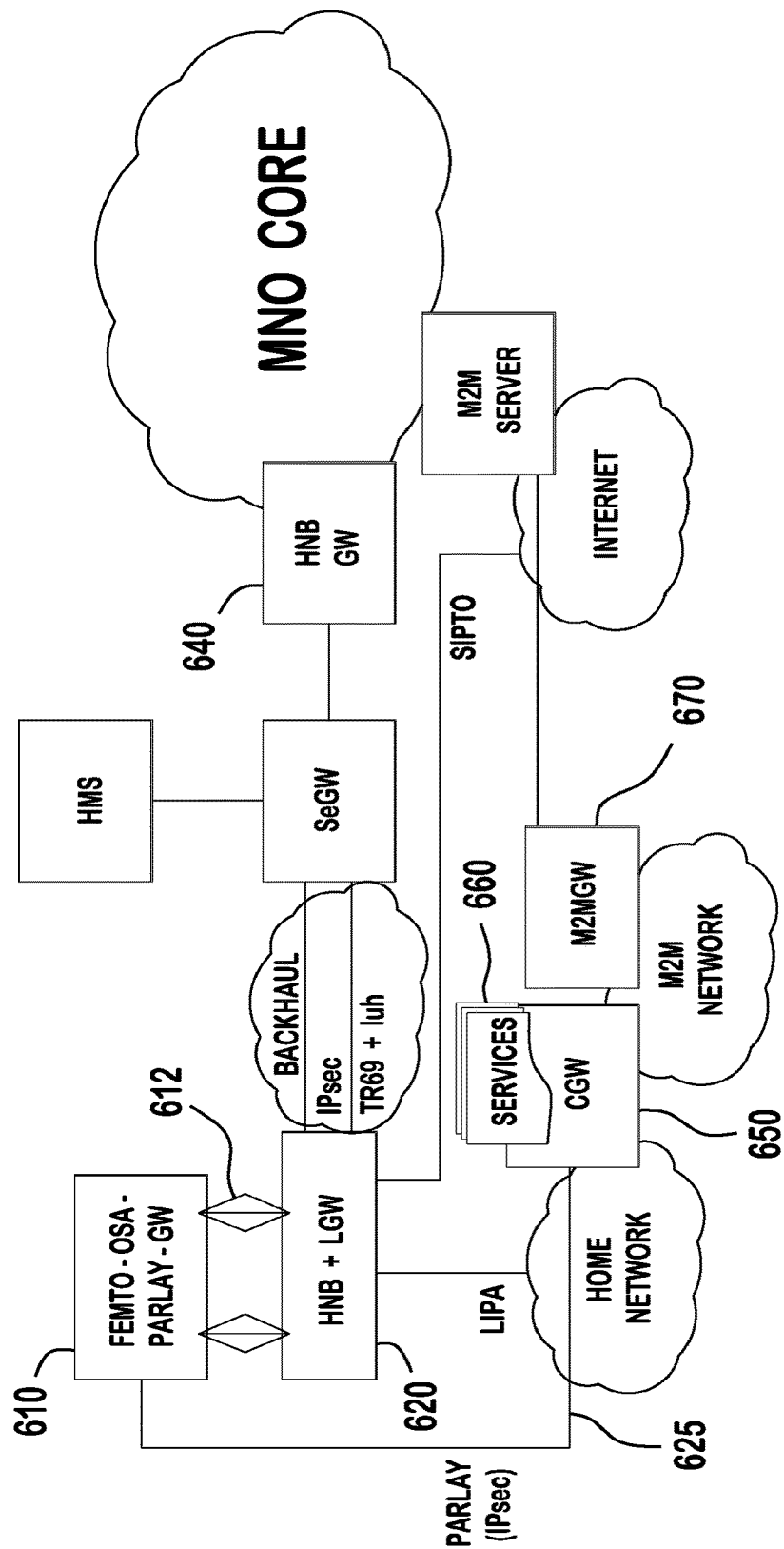
FIG. 6 shows an example case of home zone services making use of the femtocell-hosted service capabilities in accordance with one embodiment.

FIG. 6 shows an example case of home zone services making use of the femtocell-hosted service capabilities in accordance with one embodiment. The services 660 are in the home zone, in this example on the CGW 650, (e.g., home PC). Alternatively, the services may be resident on the femtocell, (e.g., HNB or HeNB). The femto-OSA-Parlay-gateway functions 610 are in the home zone, (i.e., on the femtocell or as SDK on a CGW). The femto-OSA-Parlay-gateway 610 interacts with the HNB/LGW 620 via the resource interface 612. The home zone services 660 make use of the service capabilities exposed by the femtocell.

The service capabilities may be exposed as Parlay APIs. Parlay APIs, (or resource interface if the femto-OSA-Parlay-gateway 610 is on the CGW 650 as SDK), are available through a separate IPSec tunnel 625 terminating on the CGW 650, which are then consumed at the services 660. The CGW-hosted services 660 make use of the femtocell service capabilities disclosed above and other available service capabilities within home (e.g., from M2M gateway 670) to provide services.

Figure 7:
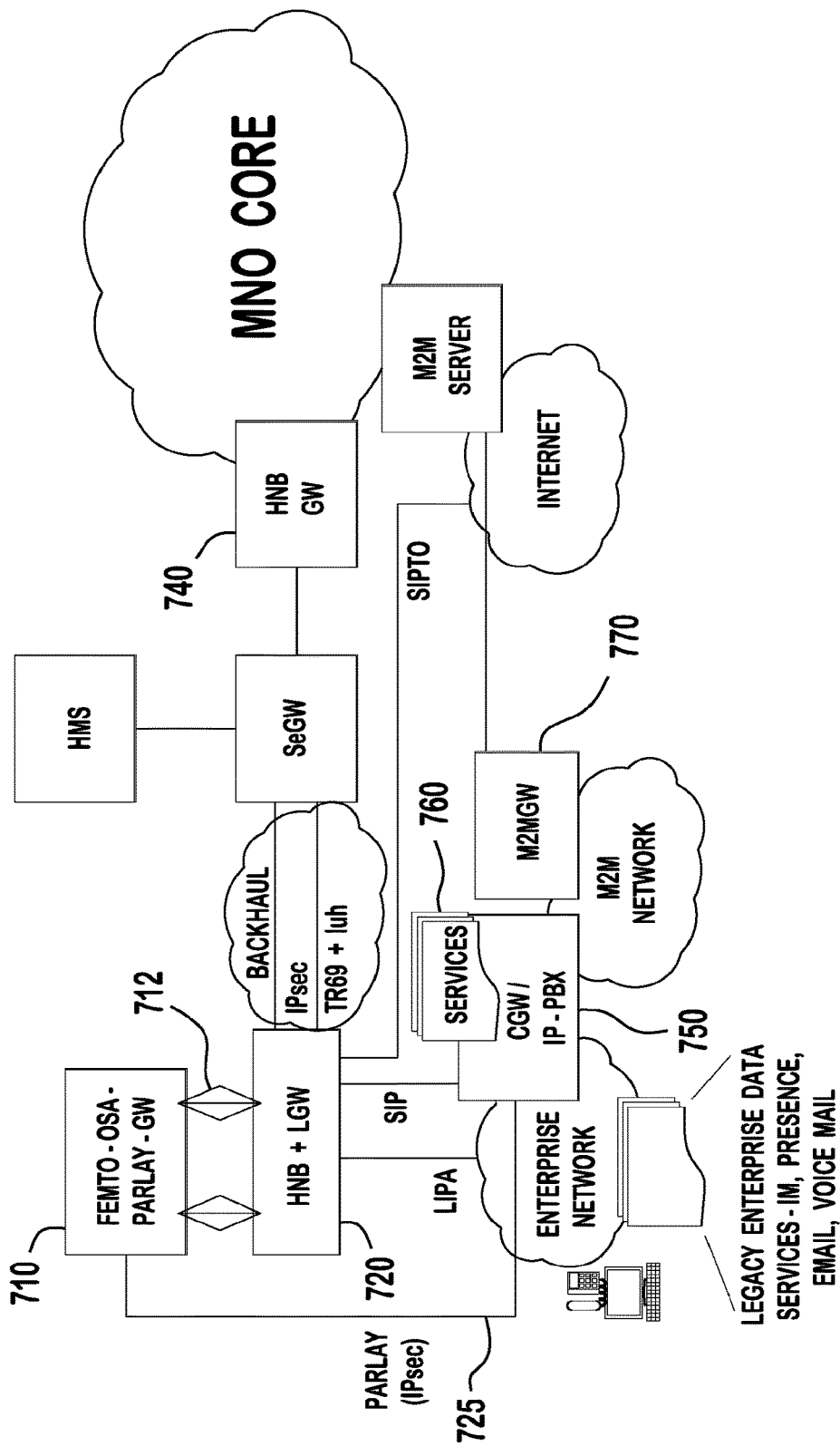
FIG. 7 shows an example case of enterprise zone services making use of femtocell-hosted service capabilities in accordance with one embodiment.

FIG. 7 shows an example case of enterprise zone services making use of femtocell-hosted service capabilities in accordance with one embodiment. The services 760 are in the enterprise zone, (in this example on a CGW 750). The IP private branch exchange (IP-PBX) in the enterprise may be included as a component of the CGW 750. Voice (user) services may be provided by the IP-PBX, and the IP-PBX may integrate with other platforms for data services. M2M convergence may be realized by integrating or interworking the M2M gateway 770 with the IP-PBX and data service platforms.

The femto-OSA-Parlay-gateway functions 710 are within the enterprise, (e.g., on the femtocell or as SDK on the CGW 750). Enterprise zone services 760 make use of service capabilities exposed by the femtocell. The service capabilities may be exposed as Parlay APIs. Parlay APIs, (or resource interface if the femto-OSA-Parlay-gateway 710 is on the CGW 750 as SDK), are available through a separate IPSec tunnel 725 terminating on the CGW 750, which are then consumed at the services 760.

The CGW-hosted services 760 make use of femtocell service capabilities disclosed above and other available service capabilities within the enterprise, (e.g., from the M2M gateway 770), to provide services.

Where the CGW-hosted enterprise zone services makes use of the femtocell service capabilities as a Third Generation (3G) modem for achieving enterprise Fixed Mobile Convergence (FMC), the femtocell may support Uu (RRC)-to-session initiation protocol (SIP) interworking to present the mobile leg of a CS call as an SIP call to the IP-PBX.

In FIGS. 6 and 7, the femtocell-based service capabilities are used by the home or enterprise-hosted services. All the SCFs that are applicable in the context of network-hosted services are applicable to the case of home/enterprise-hosted services. Such SCFs include, but are not limited to, framework SCF, mobility SCF, terminal capability SCF (femtocell capabilities SCF), data session control SCF, connectivity management SCF, and policy management SCF.

The call control SCF may apply to a home-hosted services to allow applications (in the home) to set up calls between a femto-latched WTRU and to another user through the MNO core network, or alternatively to another user within the same femtocell or femtozone, where signaling is transmitted via the MNO core network but a bearer is looped back within the femtozone. In the enterprise, the call control SCF in the femtocell may not be of much relevance as the same service capabilities exist on an IP-PBX and the femtocell simply presents a 3G modem (SIP-to-Uu interworking) to the IP-PBX to reach the mobile device.

Enterprises may liaison with the MNO and provide a separate subscriber profile account and charging principles, applicable to the enterprise, that is different from the macro subscriber profile account and charging principles. Hence, the account management and charging management SCFs may be used by the enterprise zone services.

Enterprises may have their own presence servers. Presence and watcher clients may be end user terminal solutions that interwork with the presence servers in the enterprise network. When the mobile device becomes an enterprise user terminal, the presence/watcher clients, (e.g., available on user's desktops), may need to be ported on the handset. Such presence information may transit as application data traffic over the PS path (LIPA) established through the femtocell. The presence and availability management SCF may be applicable to the femtocell to provide at least the information that the enterprise user's handset is within enterprise coverage, (i.e., femtocell).

The multimedia messaging SCF from the femtocell may be utilized by enterprise zone services to provide unified messaging experience for the FMC enterprise user.

Example call flows for interworking between the Parlay service interface and the legacy call signaling within a femtocell are disclosed hereafter. The legacy femtocell-RNC-application call model is modified to expose the resource interface. Trigger points (filter criteria) are defined in the femtocell-RNC-application to appropriately pass on signaling messages (that is otherwise interworked by the femtocell) to the femtocell-OSA-Parlay-gateway for the femtocell-OSA-Parlay-gateway to enable service level interworking. The trigger points may be statically set (e.g., through TR69 provisioning interface) on the femtocell-RNC-application.

The femtocell-OSA-Parlay-gateway may not interfere with any of the signaling that can negatively impact the timing considerations on the radio interface. Therefore, the triggers may be set for the non-access stratum (NAS) message payloads that the femtocell-RNC-application understands as direct transfer messages.

If no service logic applies to the NAS message received by the femtocell-OSA-Parlay-gateway (i.e., if no Parlay treatment is needed), the femtocell-OSA-Parlay-gateway may simply act as a transparent proxy and pass back the message to the femto-RNC-application for usual interworking. If service logic applies, then the femtocell-OSA-Parlay-gateway may, as appropriate, choose to modify some parameters or consume the message and inform the femtocell-RNC-application of subsequent actions.

Alternatively, as the femtocell-OSA-Parlay-gateway introduces an additional unnecessary hop for the case of transparent proxy, the femtocell-OSA-Parlay-gateway may apply dynamic triggers to the femtocell-RNC-application so that messages are selectively passed on to it.

FIG. 8 is an example call flow for femtocell-OSA-Parlay-gateway interworking for a presence SCF in accordance with one embodiment. Presence-related information of a WTRU, (such as entering or exiting a femtocell), may be requested by, and supplied to, an application via the presence SCF.

A WTRU 852 performs an RRC connection establishment procedure with the femtocell 854 (802). The WTRU 852 sends, as an example, an NAS location update request message in the initial direct transfer message to the femtocell 854 (804). The femtocell 854 forwards the location update request message to the femtocell-OSA-Parlay-gateway 858 (806). As the service trigger is not yet set at this time, the femtocell-OSA-Parlay-gateway 858 works as a transparent proxy. The femtocell-OSA-Parlay-gateway 858 sends the location update request message back to the femtocell 854 (808). The femtocell 854 then sends the location update request message to the MNO core network 856 (810). The WTRU 852 performs other procedures, such as mobility management (MM)-identity, MM-authentication, or security procedures, which go through the femtocell-OSA-Parlay-gateway 858 transparently as disclosed above (812).

The femtocell 854 receives a location update accept message from the MNO core network 856 (814). The femtocell 854 forwards the location update accept message to the femtocell-OSA-Parlay-gateway 858 (816). Since the WTRU 852 has been authenticated and other security procedures are successfully performed as in 812, the service trigger is set within the femto-OSA-Parlay-gateway 858, so that the service application 860 may begin to receive messages. As the service trigger has been set, the femtocell-OSA-Parlay-gateway 858 provides presence-related information to the application 860 (818). The femtocell-OSA-Parlay-gateway 858 sends the location update accept message to the femtocell 854 (820). The femtocell 854 sends the location update accept message to the WTRU 852 (822). The CN initiated RRC connection release procedure is then performed (824).

Figure 9B:
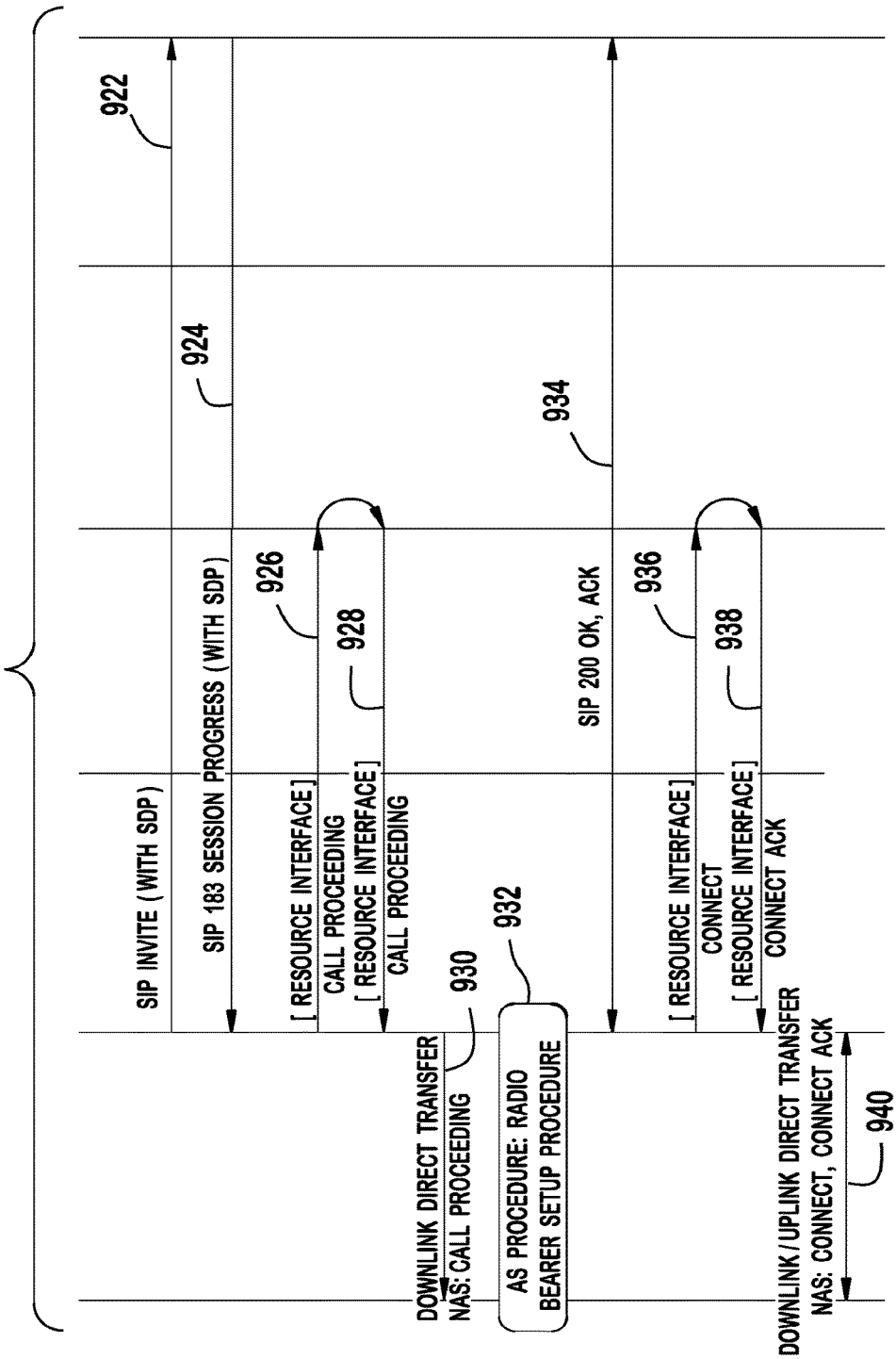

FIGS. 9A and 9B are an example call flow for femtocell-OSA-Parlay-gateway interworking for call control SCF in an intra-enterprise call case in accordance with one embodiment. It is assumed that the femtocell supports an SIP user agent (UA) function and implements a Uu-to-SIP interworking function. In this example, an enterprise mobile user calls a fixed line enterprise extension and the call is routed internally within the enterprise via an IP-PBX, instead of going all the way up to the MNO core network. Other variations are also possible. For example, the originating Iu-CS call signaling leg may go all the way up to the MNO core network, the MNO core network presents a terminating Iu-CS call leg back to the femtocell (like an intra-femtocell call), the femtocell finds that the terminating call leg user is not a mobile user latched to this femtocell and therefore forwards the terminating call leg to an IP-PBX for further routing. In all cases, the media may be restricted to within the enterprise.

A WTRU 952 performs an RRC connection establishment procedure (AS procedure) with the femtocell 954 (902). The WTRU 954 sends an initial direct transfer message (NAS CS mode (CM) service request message) to the femtocell 954 (904). The femtocell 954 passes the CM service request message to the femtocell-OSA-Parlay-gateway 958 (906). The femtocell-OSA-Parlay-gateway 958 performs as a transparent proxy, and sends the CM service request message back to the femtocell 954 (908). The femtocell 954 sends the CM service request message to the MNO core network 956 (910). The WTRU 952 performs other procedures, such as MM-identity, MM-authentication, or security procedures, which go through the femtocell-OSA-Parlay-gateway 958 transparently (812).

The WTRU 952 sends a call setup message in the UL direct transfer message to the femtocell 954 to set up a call (914). The femtocell 954 sends the call setup message to the femtocell-OSA-Parlay-gateway 958 (916). As disclosed above, the call control SCF supports requirements related to CS call control, IMS session control, call/session charging, and the like. The call control SCF supports management function for call/session-related issues, (e.g., enable or disable call/session-related event notifications), call/session control, (e.g., route, disconnect), or the like. In this example, the femtocell-OSA-Parlay-gateway 958 identifies that the destination is another enterprise user and performs call control SCF API exchange with the application 960 (918). The femtocell-OSA-Parlay-gateway 958 sends a call setup message to the femtocell 954 indicating that the destination is IP-PBX 962 (920).

The femtocell 954 sends an SIP INVITE message (with SDP) to the IP-PBX 962 (922). The IP-PBX 962 sends an SIP 183 Session Progress message (with SDP) to the femtocell 954 (924).

The femtocell 954 performs an SIP-to-NAS interworking before presenting to the femtocell-OSA-Parlay-gateway 958 and send a call proceeding message to the femtocell-OSA-Parlay-gateway 958 (926). The femtocell-OSA-Parlay-gateway 958 responds with the call proceeding message (928). The femtocell 954 sends a call proceeding message in the downlink direct transfer message to the WTRU 952 (930). The WTRU 952 and the femtocell 954 perform a radio bearer setup procedure (932). Since SDP is present in the SIP 183 Session Progress message, the femtocell 954 may execute the radio bearer setup procedure without the need for Iu RAB Assignment Request. The femtocell 954 and the IP-PBX 962 exchange SIP 200 OK and ACK messages (934). The femtocell 954 sends a connect message to the femtocell-OSA-Parlay-gateway 958 (936). The femtocell-OSA-Parlay-gateway 958 sends a connect ACK message to the femtocell 954 (938). The femtocell 954 and the WTRU 952 exchange connect and connect ACK messages (940).

The femtocell-OSA-Parlay-gateway may intercept all the layer 3 (L3) level call signaling messages and depending on Parlay triggers decide whether to transparently proxy, modify some parameters and then proxy, or consume and re-originate a different set of messages towards the femtocell.

The femtocell offers an NAS/L3 normalized resource interface towards the femtocell-OSA-Parlay-gateway. If the femtocell supports a different call signaling (like SIP) it may first interwork the SIP message to L3/NAS before offering over the resource interface.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A gateway for providing location information for a wireless transmit/receive unit (WTRU), the gateway comprising:
a processor, the processor configured to:
receive a location update message from a femtocell that includes location information for the WTRU;
determine that the WTRU has been authenticated by a security procedure between the WTRU and the femtocell;
determine whether a service for an application has been triggered for the WTRU; and
send the location information for the WTRU to the application when the service for the application has been triggered for the WTRU.

2. The gateway of claim 1, wherein the location update message is a location update request message.

3. The gateway of claim 1, wherein the location update message is a location update accept message.

4. The gateway of claim 1, wherein the processor is further configured to provide a transparent proxy when the service for the application has not been triggered for the WTRU.

5. The gateway of claim 2, wherein the processor is further configured to send the location update request message to the femtocell when it is determined that the service has not been triggered.

6. The gateway of claim 1, wherein the processor is further configured to receive a request for an application to trigger a service that provides location information for the WTRU to the application.

7. A gateway for providing location information for a wireless transmit/receive unit (WTRU), the gateway comprising:
a processor, the processor configured to:
receive a location update message from a femtocell that includes location information for the WTRU;
determine whether a service for an application has been triggered for the WTRU; and
send the location information for the WTRU to the application when the service for the application has been triggered for the WTRU.

8. The gateway of claim 7, wherein the location update message is a location update request message.

9. The gateway of claim 7, wherein the location update message is a location update accept message.

10. The gateway of claim 7, wherein the processor is further configured to provide a transparent proxy when the service for the application has not been triggered for the WTRU.

11. The gateway of claim 8, wherein the processor is further configured to send the location update request message to the femtocell when it is determined that the service has not been triggered.

12. The gateway of claim 7, wherein the processor is further configured to receive a request for an application to trigger a service that provides location information for the WTRU to the application.

13. A method for providing location information for a wireless transmit/receive unit (WTRU), the method comprising:
receiving, via a gateway, a location update message from a femtocell that includes location information for the WTRU;
determining, via the gateway, that the WTRU has been authenticated by a security procedure between the WTRU and the femtocell;
determining whether a service for an application has been triggered for the WTRU; and
sending the location information for the WTRU to the application when the service for the application has been triggered for the WTRU.

14. The method of claim 13, wherein the location update message is a location update request message.

15. The method of claim 13, wherein the location update message is a location update accept message.

16. The method of claim 13, further comprising providing a transparent proxy when the service for the application has not been triggered for the WTRU.

17. The method of claim 14, further comprising sending the location update request message to the femtocell when it is determined that the service has not been triggered.

18. The method of claim 13, further comprising receiving a request for an application to trigger a service that provides location information for the WTRU to the application.

* * * * *